United States Patent
Kotani et al.

(10) Patent No.: US 10,864,864 B2
(45) Date of Patent: Dec. 15, 2020

(54) GROMMET AND GROMMET-EQUIPPED WIRE

(71) Applicant: SUMITOMO WIRING SYSTEMS, LTD., Mie (JP)

(72) Inventors: Hisashi Kotani, Mie (JP); Yoshinori Murase, Aichi-ken (JP); Kei Kawasaki, Aichi-ken (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 99 days.

(21) Appl. No.: 16/052,031

(22) Filed: Aug. 1, 2018

(65) Prior Publication Data

US 2019/0039540 A1 Feb. 7, 2019

(30) Foreign Application Priority Data

Aug. 2, 2017 (JP) .................. 2017-149807

(51) Int. Cl.
*H02G 3/22* (2006.01)
*B60R 16/02* (2006.01)
(Continued)

(52) U.S. Cl.
CPC ............. *B60R 16/0222* (2013.01); *B60J 5/04* (2013.01); *H01B 17/583* (2013.01);
(Continued)

(58) Field of Classification Search
CPC .... B60R 16/0222; B60R 16/0207; B60J 5/04; B60J 5/0401; B60J 5/0412; B60J 5/0413; B60J 5/0415; B60J 5/0416; H02G 3/0468; H02G 3/04; H02G 3/36; H02G 3/0406; H02G 3/22; H01B 17/583
USPC .... 174/650, 152 R, 152 G, 153 G, 135, 142, 174/137 R, 151, 17 CT; 248/56; 439/271, 272; 16/2.1, 2.2
See application file for complete search history.

(56) References Cited

U.S. PATENT DOCUMENTS 7,868,256 B2 * 1/2011 Suzuki ................ B60R 16/0222
16/2.1
7,943,854 B1 * 5/2011 Lipp .................... H02G 3/0468
16/2.1
(Continued)

FOREIGN PATENT DOCUMENTS

JP 2012-010494 1/2012

*Primary Examiner* — Angel R Estrada
(74) *Attorney, Agent, or Firm* — Greenblum & Bernstein, P.L.C.

(57) ABSTRACT

Provided is a grommet with high durability against bending and a grommet-equipped wire. A wire can be inserted in a grommet. The grommet includes a first fixing portion to be fixed to a door panel, a second fixing portion to be fixed to a vehicle panel, and a connecting portion that is elastically deformable and that connects the first fixing portion and the second fixing portion to each other. In this grommet, in a closed state in which the door panel is closed relative to the vehicle panel, an intermediate portion of the connecting portion hangs down to a level that is lower than levels of opposite end portions of the connecting portion. Accordingly, when the door is opened, the vehicle panel and the door panel are separated from each other, and the intermediate portion of the connecting portion is thereby lifted.

8 Claims, 5 Drawing Sheets

(51) Int. Cl.
  *B60J 5/04*    (2006.01)
  *H01B 17/58*   (2006.01)
  *H02G 3/04*    (2006.01)
  *H02G 11/00*   (2006.01)
(52) U.S. Cl.
  CPC ............ *H02G 3/0468* (2013.01); *H02G 3/22*
          (2013.01); *H02G 11/00* (2013.01)

(56) References Cited

U.S. PATENT DOCUMENTS 7,952,032 B2 * 5/2011 Suzuki ................. H02G 3/0468
                                                174/152 G
8,420,943 B1 * 4/2013 La ....................... B60R 16/0222
                                                 16/2.1

* cited by examiner

GROMMET AND GROMMET-EQUIPPED WIRE

TECHNICAL FIELD

The present invention relates to a grommet and a grommet-equipped wire that are used for vehicle doors.

BACKGROUND ART

In the case where a wire harness is disposed extending via a through hole provided in a vehicle panel of an automobile and a through hole provided in a door panel of that automobile, a grommet is generally provided around the wire harness in order to protect the wire harness.

JP 2012-10494A discloses a grommet that has a bellows portion with ridge portions and valley portions that are formed successively in an axial direction of the grommet. In a state in which a door panel is closed relative to a vehicle panel, the door panel and the vehicle panel are near to each other, and thus, the bellows portion is contracted. In a state in which the door panel is open relative to the vehicle panel, the door panel and the vehicle panel are separated from each other, and thus, the bellows portion is expanded. In this manner, the grommet is bendably expandable and contractible in accordance with the opening and closing motion of the door panel.

JP 2012-10494A is an example of related art.

When the door panel is repeatedly opened and closed, the number of times the grommet expands and contracts increases accordingly. The configuration in which the bendable expansion and contraction of the grommet in accordance with the opening and closing motion of the door panel is achieved mainly due to expansion and contraction of the bellows portion is likely to cause localized concentration of bending stress.

Moreover, with respect to commercial vehicles, such as delivery vehicles and taxis, door panels are more frequently opened and closed compared with those of passenger automobiles, and therefore, there is demand for a grommet with high durability against bending.

The present invention was made in view of the above-described problems, and it is an object thereof to provide a grommet with high durability against bending and a grommet-equipped wire.

SUMMARY OF THE INVENTION

To address the above-described problems, a grommet according to a first aspect is a grommet in which a wire can be inserted, the grommet including a first fixing portion to be fixed to a door panel, a second fixing portion to be fixed to a vehicle panel, and a connecting portion that is elastically deformable and that connects the first fixing portion and the second fixing portion to each other, wherein, in a closed state in which the door panel is closed relative to the vehicle panel, an intermediate portion of the connecting portion hangs down to a level that is lower than levels of opposite end portions of the connecting portion.

A grommet according to a second aspect is the grommet according to the first aspect, wherein, in an open state in which the door panel is open relative to the vehicle panel, the intermediate portion of the connecting portion hangs down to a level that is lower than the levels of the opposite end portions of the connecting portion, and a hanging-down amount of the intermediate portion in the open state is smaller than a hanging-down amount of the intermediate portion in the closed state.

A grommet according to a third aspect is the grommet according to the first or second aspect, wherein the connecting portion has, as constituent elements in which the wire can be inserted, a first tubular portion that is located at the end portion of the connecting portion on the first fixing portion side, a second tubular portion that is located at the end portion of the connecting portion on the second fixing portion side, and a bellows portion that has a bellows-like shape and that is connected to the first tubular portion and the second tubular portion, and a portion of the first tubular portion on the bellows portion side and a portion of the second tubular portion on the bellows portion both extend downward.

A grommet according to a fourth aspect is the grommet according to any one of the first to third aspects, wherein the intermediate portion is a portion that deforms in accordance with switching between an open state in which the door panel is open relative to the vehicle panel and the closed state, the opposite end portions are portions that each have the same shape in both the open state and the closed state, and a length of the intermediate portion is larger than a distance between the opposite end portions in the open state.

A grommet-equipped wire according to a fifth aspect includes the grommet according to any one of the first to fourth aspects, and a wire that is inserted in the grommet.

According to the first to fourth aspects, in the closed state in which a door is closed relative to the vehicle panel, the intermediate portion of the connecting portion hangs down to a level that is lower than the levels of the opposite end portions of the connecting portion. Accordingly, when the door is opened, the vehicle panel and the door panel are separated from each other, and the intermediate portion of the connecting portion is thereby lifted. In this manner, during opening and closing of the door, the grommet is bent mainly as a result of the hanging shape of the connecting portion changing. According to these aspects, compared with a configuration in which a grommet is bent mainly due to expansion and contraction of the connecting portion, the durability of the grommet against bending is improved.

According to the second aspect, in the open state in which the door panel is open relative to the vehicle panel, the intermediate portion of the connecting portion hangs down to a level that is lower than the levels of the opposite end portions of the connecting portion. Moreover, the hanging-down amount of the intermediate portion in the open state is smaller than the hanging-down amount of the intermediate portion in the closed state. In this manner, according to the aspect in which the intermediate portion hangs down in both the open state and the closed state, the grommet is bent mainly as a result of the hanging shape changing, and thus the durability of the grommet against bending is improved.

According to the third aspect, both the portion of the first tubular portion on the bellows portion side and the portion of the second tubular portion on the bellows portion side extend downward. Thus, a state in which the bellows portion, which is connected to the first tubular portion and the second tubular portion, hangs down due to the effect of gravity is maintained, so that the bellows portion is unlikely to interfere with a nearby member, and the bellows portion can be disposed in a space-saving manner.

According to the fourth aspect, the length of the intermediate portion is larger than the distance between the opposite end portions in the open state. In this manner, a sufficient length is ensured for the intermediate portion, which deforms in accordance with opening and closing of the door panel, and thus, stress that is exerted on the grommet during opening and closing of the door panel is distributed, and the durability of the grommet against bending is improved.

According to the fifth aspect, the wire is protected using the grommet with high durability against bending, and thus, even after the door panel is repeatedly opened and closed, a state in which the wire is protected can be effectively maintained.

EMBODIMENTS OF THE INVENTION

Hereinafter, a grommet 1 according to an embodiment will be described.

Figure 1:
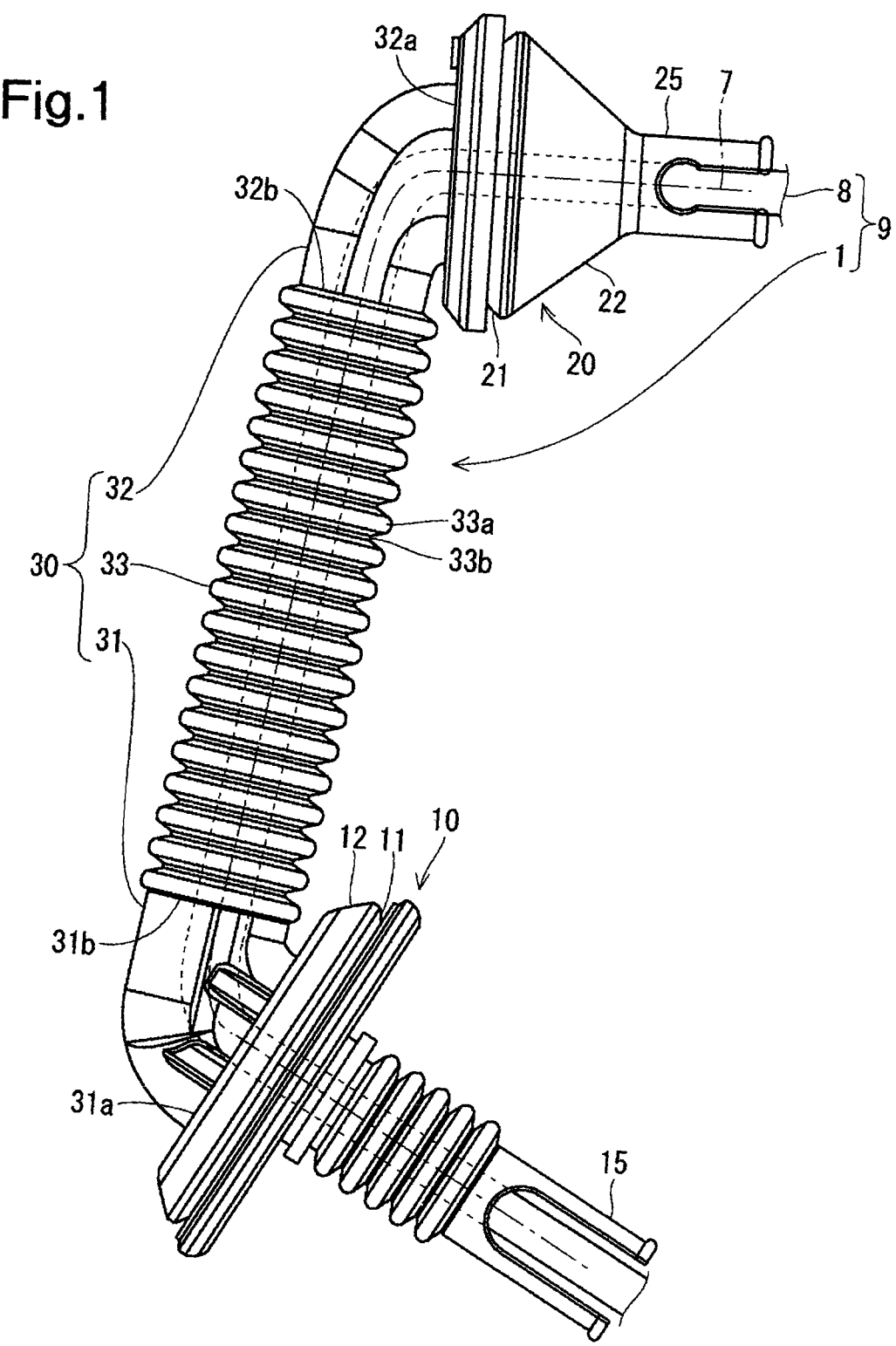
FIG. 1 is a side view showing a grommet before being attached to an automobile.
Figure 2:
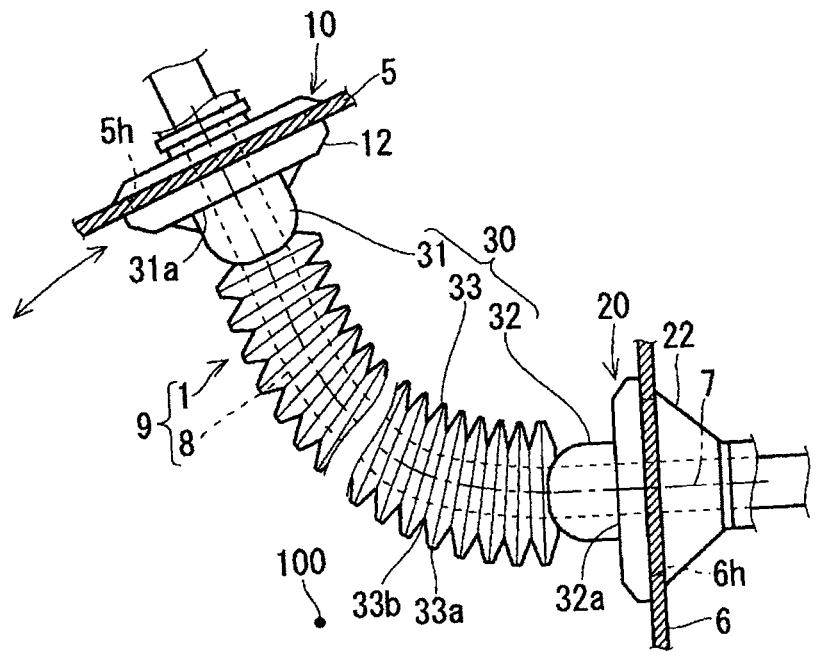
FIG. 2 is a schematic plan view showing the grommet in a closed state.
Figure 3:
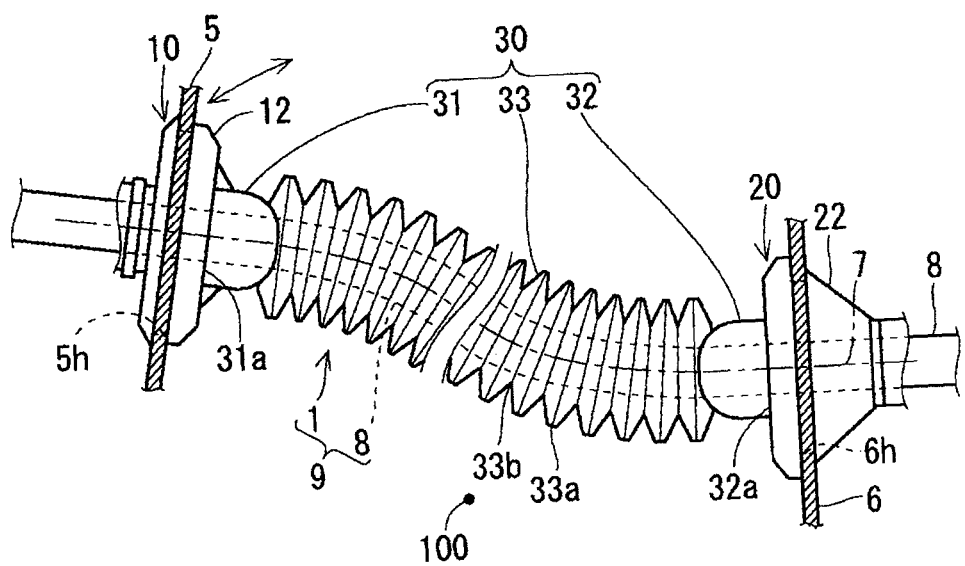
FIG. 3 is a schematic plan view showing the grommet in an open state.

FIG. 1 is a side view showing a grommet 1 before being attached to an automobile. FIG. 2 is a schematic plan view showing the grommet 1 in a closed state in which the grommet 1 is attached to the automobile and a door panel 5 is closed. FIG. 3 is a schematic plan view showing the grommet 1 in an open state in which the grommet 1 is attached to the automobile and the door panel 5 is open.

The grommet 1 is a tubular member that is composed of an elastic material, such as rubber or an elastomer, and in which a wire 8 can be inserted. Note that, in FIG. 1, an axis 7 of an internal space of the grommet 1 is shown with a long dashed double-short dashed line. Here, the axis 7 corresponds to a line that connects the centers of transverse sections of the internal space of the tubular grommet 1.

A grommet-equipped wire 9 is obtained by a worker inserting the wire 8 into the internal space of the grommet 1 along the axis 7. The grommet-equipped wire 9 is used when the wire 8 is arranged extending via a through hole provided in a vehicle panel 6 of the automobile and a through hole provided in the door panel 5 of the automobile.

The vehicle panel 6 is a portion that is immovable relative to the main body of the automobile, whereas the door panel 5 is movable in a direction toward the vehicle panel 6 or a direction away from the vehicle panel 6. Specifically, the door panel 5 is movable following an arc around a hinge 100, which is shown in a simplified manner in FIGS. 2 and 3, in the direction toward the vehicle panel 6 or the direction away from the vehicle panel 6. In FIGS. 2 and 3, the directions in which the door panel 5 is movable are indicated by the arcuate, double-headed arrows.

Here, a state in which the door panel 5 is nearest to the vehicle panel 6 and the door of the automobile is closed is referred to as the closed state, and a state in which the door panel 5 is partially separated from the vehicle panel 6 and the door of the automobile is open is referred to as the open state. When the door panel 5 is opened or closed relative to the vehicle panel 6, the grommet 1 follows the opening/closing motion and bendably deforms. Moreover, due to the opening/closing motion of the door panel 5, the wire 8 is also pressed against by an inner wall of the grommet 1, and the wiring path of the wire 8 changes.

In the grommet-equipped wire 9, the grommet 1 has the function of protecting the wire 8 inserted therein from shock and moisture. Here, a case where the wire 8 inserted in the grommet 1 is a wire harness in which a plurality of wires are bundled together is described; however, the wire 8 may be composed of a single wire.

Figure 4:
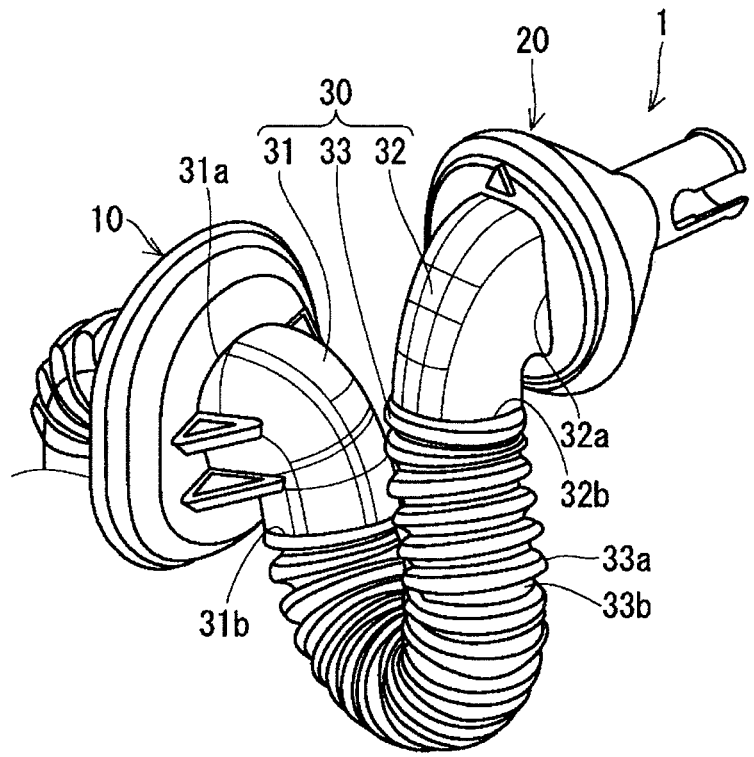
FIG. 4 is a perspective view showing the grommet in the closed state.
Figure 5:
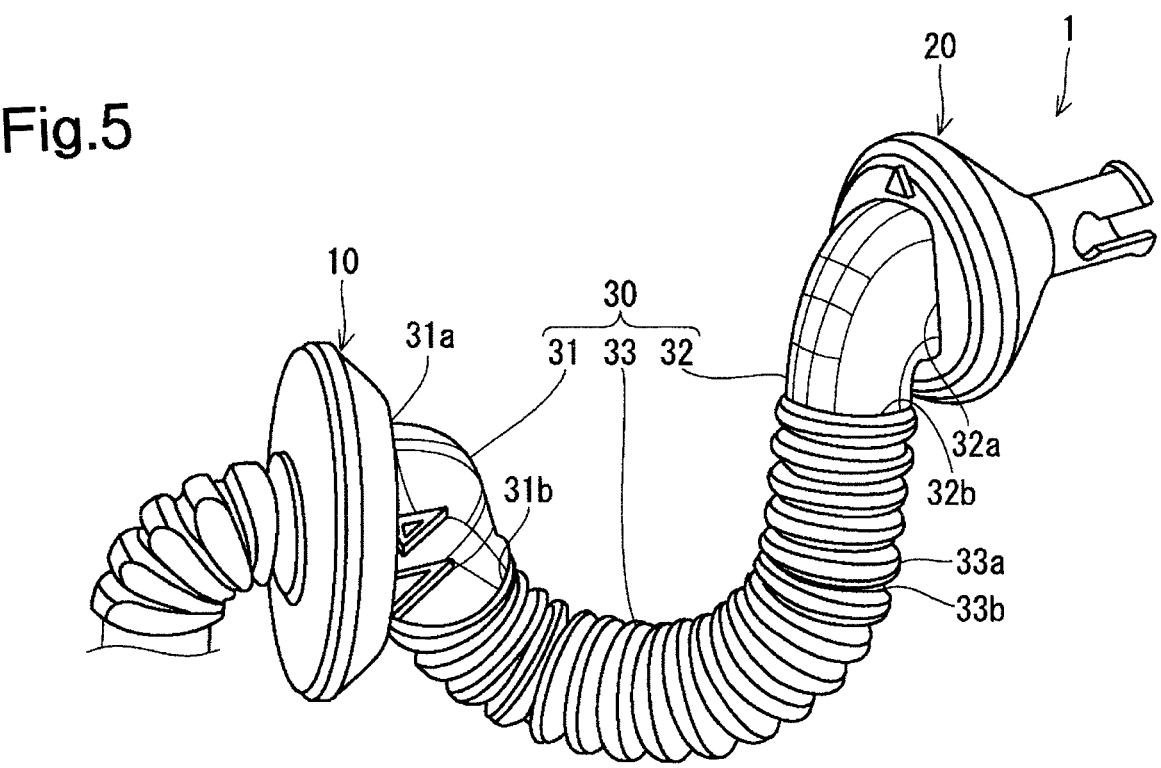
FIG. 5 is a perspective view showing the grommet in the open state.

FIG. 4 is a perspective view showing the grommet 1 attached to the automobile in the closed state in which the door panel 5 is closed. FIG. 5 is a perspective view showing the grommet 1 attached to the automobile in the open state in which the door panel 5 is open. Note that, from the standpoint of showing the configuration of the grommet 1, the door panel 5 and the vehicle panel 6 are omitted from FIGS. 4 and 5.

Hereinafter, a detailed configuration of the grommet 1 will be described with reference to FIGS. 1 to 5. Note that, in FIGS. 2 and 3, the front side of the paper plane means the upper side in the vertical direction, and the back side of the paper plane means the lower side in the vertical direction. In FIGS. 4 and 5, the upper side of the paper plane means the upper side in the vertical direction, and the lower side of the paper plane means the lower side in the vertical direction.

The grommet 1 has a first fixing portion 10, a second fixing portion 20, and a connecting portion 30 in a state in which internal spaces of the respective portions are in communication with one another along the axis 7.

The first fixing portion 10 has an annular groove 11 in an outer surface thereof, and is to be fixed to the door panel 5. The outer diameter of the groove 11 and the inner diameter of a through hole 5h of the door panel 5 are the same. Moreover, an inclined surface 12 is provided in the outer surface of the first fixing portion 10, the outer diameter of the inclined surface 12 gradually increasing from the second fixing portion 20 side toward a side that is opposite to the second fixing portion 20.

Accordingly, when a worker pushes the first fixing portion 10 into the through hole 5h of the door panel 5 that is located on the second fixing portion 20 side, an edge portion of the through hole 5h of the door panel 5 is guided over the inclined surface 12. While the edge portion of the through hole 5h of the door panel 5 is being guided, the inclined surface 12 is pressed against by that edge portion in a diameter-reducing direction, and the first fixing portion 10 elastically deforms in the diameter-reducing direction. Then, upon the inclined surface 12 passing the edge portion of the through hole 5h of the door panel 5, the first fixing portion 10 returns to its original shape under a restoring force, and thus, the edge portion of the through hole 5h of the door panel 5 is fitted into the groove 11 of the first fixing portion 10. As a result, the grommet 1 is fixed to the door panel 5.

The second fixing portion 20 has an annular groove 21 in an outer surface thereof, and is to be fixed to the vehicle panel 6. The outer diameter of the groove 21 and the inner diameter of a through hole 6h of the vehicle panel 6 are the same. Moreover, an inclined surface 22 is provided in the outer surface of the second fixing portion 20, the outer diameter of the inclined surface 22 gradually increasing from a side that is opposite to the first fixing portion 10 toward the first fixing portion 10 side.

Accordingly, when the worker pushes the second fixing portion 20 into the through hole 6h of the vehicle panel 6 that is located on the opposite side to the first fixing portion 10, an edge portion of the through hole 6h of the vehicle panel 6 is guided over the inclined surface 22. While the edge portion of the through hole 6h of the vehicle panel 6 is being guided, the inclined surface 22 is pressed against by that edge portion in the diameter-reducing direction, and the second fixing portion 20 elastically deforms in the diameter-reducing direction. Then, upon the inclined surface 22 passing the edge portion of the through hole 6h of the vehicle panel 6, the second fixing portion 20 returns to its original shape under a restoring force, and thus, the edge portion of the through hole 6h of the vehicle panel 6 is fitted into the groove 21 of the second fixing portion 20. As a result, the grommet 1 is fixed to the vehicle panel 6.

Moreover, an end portion 15 that partially covers an outer peripheral surface of the wire 8 is provided at a position in the grommet 1 that is nearer to an end of the grommet 1 than the first fixing portion 10 is. An end portion 25 that partially covers the outer peripheral surface of the wire 8 is provided at a position in the grommet 1 that is nearer to the other end of the grommet 1 than the second fixing portion 20 is. Accordingly, when, in a state in which the wire 8 is inserted in the grommet 1, pieces of tape or the like are wound around outer peripheral portions of the end portion 15 and the end portion 25, respectively, the grommet 1 is fixed to the wire 8 at the two portions.

The connecting portion 30 is elastically deformable and connects the first fixing portion 10 and the second fixing portion 20 to each other. Moreover, the connecting portion 30 has, as constituent elements in which the wire 8 can be inserted, a first tubular portion 31 that is located at an end portion of the connecting portion 30 on the first fixing portion 10 side, a second tubular portion 32 that is located at the other end portion of the connecting portion 30 on the second fixing portion 20 side, and a bellows portion 33 that has a bellows-like shape and that is connected to the first tubular portion 31 and the second tubular portion 32.

The first tubular portion 31 is a tubular portion that bends the wiring path of the wire 8 inserted therein. One end 31a of the first tubular portion 31 is connected to the first fixing portion 10, and the other end 31b of the first tubular portion 31 is connected to one end of the bellows portion 33. Moreover, the first tubular portion 31 does not have protrusions and depressions such as those of the bellows portion 33 and is configured to have a larger wall thickness than the bellows portion 33. Therefore, the first tubular portion 31 has the same shape in both the open state and the closed state. Accordingly, a portion of the wire 8 inserted in the grommet 1, the portion passing through the first tubular portion 31, is arranged along the same path in both the open state and the closed state.

The second tubular portion 32 is a tubular portion that bends the wiring path of the wire 8 inserted therein. One end 32a of the second tubular portion 32 is connected to the second fixing portion 20, and the other end 32b of the second tubular portion 32 is connected to the other end of the bellows portion 33. Moreover, the second tubular portion 32 does not have protrusions and depressions such as those of the bellows portion 33 and is configured to have a larger wall thickness than the bellows portion 33. Therefore, the second tubular portion 32 has the same shape in both the open state and the closed state. Accordingly, a portion of the wire 8 inserted in the grommet 1, the portion passing through the second tubular portion 32, is arranged along the same path in both the open state and the closed state.

The bellows portion 33 is a corrugated portion having annular ridge portions 33a and annular valley portions 33b that are alternatingly successively formed in the direction of the axis 7 of the grommet 1, and is configured to be bendable in accordance with the opening and closing motion of the door panel 5. Accordingly, the bellows portion 33 is expandable and contractible in the direction of the axis 7 and also flexible in such a manner as to be bendable in a direction at an angle to the axis 7, and deforms in accordance with switching between the open state and the closed state. Thus, the path along which a portion of the wire 8 inserted in the grommet 1, the portion passing through the bellows portion 33, is arranged is different between the open state and the closed state.

In this manner, the first tubular portion 31 and the second tubular portion 32 correspond to opposite end portions of the connecting portion 30, and the bellows portion 33 corresponds to an intermediate portion of the connecting portion 30. Note that it is not essential that the first tubular portion 31 and the second tubular portion 32 be provided as in the present embodiment, and either one of them may be omitted, or both of them may be omitted. If the first tubular portion 31 or the second tubular portion 32 is omitted, the corresponding end portion of the bellows portion 33 is directly connected to the first fixing portion 10 or the second fixing portion 20. In this case, a portion where that end portion of the bellows portion 33 is directly connected to the first fixing portion 10 or the second fixing portion 20 corresponds to the end portion of the connecting portion 30, and the bellows portion 33 corresponds to the intermediate portion of the connecting portion 30.

As shown in FIG. 4, in the closed state, the bellows portion 33 (i.e., the intermediate portion of the connecting portion 30) hangs down to a level that is lower than the levels of the first tubular portion 31 and the second tubular portion 32 (i.e., the opposite end portions of the connecting portion 30). Then, as shown in FIG. 5, while the door panel 5 is being opened, the vehicle panel 6 and the door panel 5 are separated from each other, and the bellows portion 33, which is the intermediate portion of the connecting portion 30, is thereby lifted.

Figure 6:
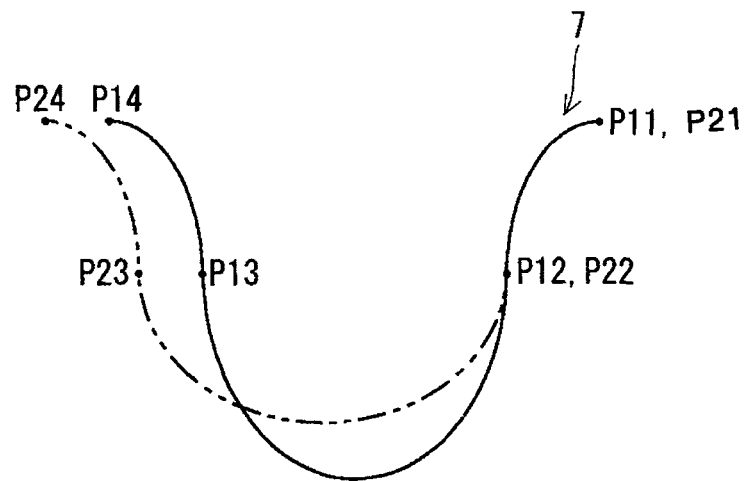
FIG. 6 is a conceptual diagram illustrating paths of an axis of the grommet in the closed state and the open state.

Here, paths of the axis 7 of the grommet 1 in the closed state and the open state will be described with reference to FIG. 6. FIG. 6 is a conceptual diagram illustrating paths of the axis 7 of the grommet 1 in the closed state and the open state. Note that, in FIG. 6, the axis 7 in the closed state is shown with a solid line, and the axis 7 in the open state is shown with a long dashed double-short dashed line. Also, for the purpose of indicating specific positions on the axis 7 in the closed state, points P11 to P14 are shown as imaginary points. Similarly, for the purpose of indicating specific positions on the axis 7 in the open state, points P21 to P24 are shown as imaginary points.

In FIG. 6, the point P11 indicates the position corresponding to the end 32a of the second tubular portion 32, on the axis 7 in the closed state. The point P12 indicates the position of the end 32b of the second tubular portion 32, on the axis 7 in the closed state. The point P13 indicates the position corresponding to the end 31b of the first tubular portion 31, on the axis 7 in the closed state. The point P14 indicates the position corresponding to the end 31a of the first tubular portion 31, on the axis 7 in the closed state. Accordingly, as indicated by the points P12 and P13, the grommet 1 in the closed state has a U-shape in which the bellows portion 33 hangs down to a level that is lower than the levels of the first tubular portion 31 and the second tubular portion 32.

Moreover, in FIG. 6, the point P21 indicates the position corresponding to the end 32a of the second tubular portion 32, on the axis 7 in the open state. The point P22 indicates the position corresponding to the end 32b of the second tubular portion 32, on the axis 7 in the open state. The point P23 indicates the position corresponding to the end 31b of the first tubular portion 31, on the axis 7 in the open state. The point P24 indicates the position corresponding to the end 31a of the first tubular portion 31, on the axis 7 in the open state. Accordingly, as indicated by the points P22 and P23, the grommet 1 in the open state has a U-shape in which the bellows portion 33 hangs down to a level that is lower than the levels of the first tubular portion 31 and the second tubular portion 32.

As described above, a configuration is adopted in which the vehicle panel 6 is immovable, and the door panel 5 is movable. Moreover, each of the first tubular portion 31 and the second tubular portion 32 has the same shape in both the open state and the closed state. Accordingly, the positions of the point P11 and the point P21 coincide with each other, and the positions of the point P12 and the point P22 also coincide with each other. Moreover, the path of the axis 7 in a section between the point P13 and the point P14 and the path of the axis 7 in a section between the point P23 and the point P24 have the same shape. On the other hand, the path of the axis 7 in a section between the point P22 and the point P23 (i.e., path of the bellows portion 33 in the open state) is lifted up and elongated in the left-right direction, compared with the path of the axis 7 in a section between the point P12 and the point P13 (i.e., path of the bellows portion 33 in the closed state).

In the present embodiment, in the closed state, the bellows portion 33 hangs down to a level that is lower than the levels of the first tubular portion 31 and the second tubular portion 32. Accordingly, during switching from the closed state to the open state, the vehicle panel 6 and the door panel 5 are separated from each other, and the bellows portion 33 is thereby lifted. Conversely, during switching from the open state to the closed state, the vehicle panel 6 and the door panel 5 are brought near to each other, and the bellows portion 33 is thereby caused to hang down to a lower level.

In this manner, the stress exerted on the grommet 1 during opening and closing of the door mainly acts to change the hanging shape of the bellows portion 33, and is unlikely to act to expand and contract the bellows portion 33. Accordingly, localized concentration of bending stress in the annular ridge portions 33a and the annular valley portions 33b of the bellows portion 33 due to an increase in the number of times the grommet 1 expands and contracts is suppressed, and the durability of the grommet 1 against bending is improved. Note that it does not matter if the bellows portion 33 slightly expands and contracts due to the effect of the stress exerted on the grommet 1 when the door is opened and closed.

Moreover, in the present embodiment, the first tubular portion 31 and the second tubular portion 32 are at the same level in the closed state and the open state, and therefore, device design is easy in terms of attachment of the grommet-equipped wire 9 to the automobile. Note that it is not essential that these tubular portions be at the same level, and the tubular portions may be at different levels. Moreover, it is preferable that the first tubular portion 31 and the second tubular portion 32 are at approximately the same level, and, for example, a configuration may also be adopted in which the first tubular portion 31 is at a level that is several tens of millimeters higher than the second tubular portion 32.

Moreover, in the present embodiment, the length of the bellows portion 33 (i.e., length of the intermediate portion of the connecting portion 30) is larger than the distance between the first tubular portion 31 and the second tubular portion 32 (i.e., distance between the opposite end portions of the connecting portion 30) in the open state. Here, the length of the intermediate portion of the connecting portion 30 refers to the length between the points P12 and P13 or the points P22 and P23 along the axis 7. Also, the distance between the opposite end portions of the connecting portion 30 refers to the distance between lower end portions (i.e., portions that support the bellows portion 33) of the first tubular portion 31 and the second tubular portion 32 along the axis 7. In this manner, a sufficient length is ensured for the bellows portion 33, which deforms in accordance with opening and closing of the door panel 5, and therefore, the stress exerted on the grommet 1 during opening and closing of the door panel 5 is distributed.

The stress mainly acts to change the hanging shape of the bellows portion 33, and is unlikely to act to expand and contract the bellows portion 33. Accordingly, in the grommet 1, the distance along the axis 7 of the section between the points P12 and P13 and the distance along the axis 7 of the section between the points P22 and P23 are the same. In this manner, the grommet 1 is bent mainly as a result of the hanging shape changing, and the durability of the grommet 1 against bending is improved. Note that it is not essential that the above-described distances be the same, and, for example, the distance along the axis 7 of the section between the points P12 and P13 may be slightly larger than the distance along the axis 7 of the section between the points P22 and P23.

Moreover, the length of the bellows portion 33 (i.e., length between the points P12 and P13 or the points P22 and P23 along the axis 7) may be the same as the distance between the first tubular portion 31 and the second tubular portion 32 in the open state (i.e., linear distance between the point P22 and the point P23). In this case, the bellows portion 33 does not hang down in the open state, but rather is linearly stretched between the point P22 and the point P23 in the open state.

Moreover, in the present embodiment, the bellows portion 33 hangs down in both the open state and the closed state, and the hanging-down amount of the bellows portion 33 in the open state is smaller than the hanging-down amount of the bellows portion 33 in the closed state. In this manner, according to an aspect in which the bellows portion 33 hangs down in both the open state and the closed state, the grommet 1 is bent mainly as a result of the hanging shape changing, and thus, the durability of the grommet 1 against bending is improved.

Moreover, in the present embodiment, at any point in time during the opening and closing motion of the door panel 5, a portion of the first tubular portion 31 on the bellows portion 33 side and a portion of the second tubular portion 32 on the bellows portion 33 side both extend downward. Thus, a state in which the bellows portion 33 connected to the first tubular portion 31 and the second tubular portion 32 hangs down due to the effect of gravity is maintained, so that the bellows portion 33 is unlikely to interfere with a nearby member, and the bellows portion 33 can be disposed in a space-saving manner. Note that it is not essential that both the portion of the first tubular portion 31 on the bellows portion 33 side and the portion of the second tubular portion 32 on the bellows portion 33 side extend downward, and at least one of these portions may extend horizontally or upward.

In the grommet-equipped wire 9, since the wire 8 is protected using the grommet 1 that has high durability against bending as described above, the state in which the wire 8 is protected can be effectively maintained even after the door panel 5 is repeatedly opened and closed. The grommet-equipped wire 9 is applicable to door portions of passenger automobiles, but is especially suitable for commercial vehicles, such as delivery vehicles and taxis, (e.g., automobiles whose doors are frequently opened and closed and for which high durability against bending is required). Moreover, since front doors are generally more frequently opened and closed than rear doors, the grommet-equipped wire 9 is especially suitable for front door portions.

Next, first to fourth comparative examples, which are comparative examples of the grommet 1 according to the present embodiment, will be described with reference to FIGS. 7 to 10. In the comparative examples below, constituent elements that are the same as various portions of the present embodiment will be denoted by the same reference numerals, and a redundant description will not be given. Moreover, axes 7A to 7D of grommets according to the first to fourth comparative examples correspond to the axis of the internal space of the bellows portion.

Figure 7:
FIG. 7 is a conceptual diagram illustrating paths of an axis of a linear grommet according to a first comparative example.

FIG. 7 is a conceptual diagram illustrating paths of the axis 7A of a linear grommet according to the first comparative example. Note that, in FIG. 7, the axis 7A in the closed state is shown with a solid line, and the axis 7A in the open state is shown with a long dashed double-short dashed line. Moreover, for the purpose of indicating specific positions on the axis 7A in the closed state, points P31 and P32 are shown as imaginary points. Similarly, for the purpose of indicating specific positions on the axis 7A in the open state, points P41 and P42 are shown as imaginary points.

In FIG. 7, the point P31 indicates the position corresponding to an end portion of the axis 7A on the second fixing portion 20 side in the closed state. The point P32 indicates the position corresponding to the other end portion of the axis 7A on the first fixing portion 10 side in the closed state. The point P41 indicates the position corresponding to the end portion of the axis 7A on the second fixing portion 20 side in the open state. The point P42 indicates the position corresponding to the end portion of the axis 7A on the first fixing portion 10 side in the open state. Since the vehicle panel 6 is an immovable portion as described above, the points P31 and P41 on the second fixing portion 20 side, which is fixed to the vehicle panel 6, are at the same position.

As indicated by the points P31 and P32, in the first comparative example, the bellows portion is linearly stretched in the closed state. Moreover, as indicated by the points P41 and P42, in the first comparative example, the bellows portion is linearly stretched in the open state to be longer than that in the closed state. In the first comparative example, the stress exerted on the grommet in accordance with the opening and closing motion of the door panel 5 mainly acts in a direction in which the stress makes the bellows portion expand and contract. In the first comparative example, the bellows portion expands and contracts in accordance with the opening and closing motion of the door panel, and thus, bending stress is likely to concentrate locally on the ridge portions and the valley portions of the bellows portion.

Figure 8:
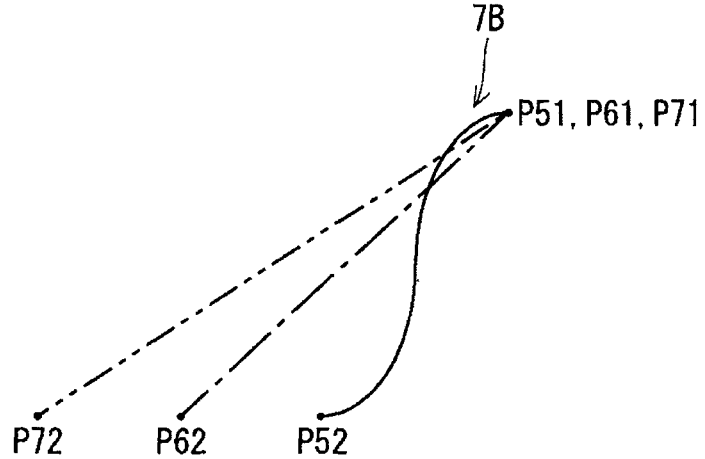
FIG. 8 is a conceptual diagram illustrating paths of an axis of an S-shaped grommet according to a second comparative example.

FIG. 8 is a conceptual diagram illustrating paths of the axis 7B of an S-shaped grommet according to the second comparative example. Note that, in FIG. 8, the axis 7B in the closed state is shown with a solid line, the axis 7B in an intermediate state between the closed state and the open state is shown with a long dashed short dashed line, and the axis 7B in the open state is shown with a long dashed double-short dashed line. Moreover, for the purpose of indicating specific positions on the axis 7B in the closed state, points P51 and P52 are shown as imaginary points. For the purpose of indicating specific positions on the axis 7B in the intermediate state, points P61 and P62 are shown as imaginary points. For the purpose of indicating specific positions on the axis 7B in the open state, points P71 and P72 are shown as imaginary points.

In FIG. 8, the point P51 indicates the position corresponding to an end portion of the axis 7B on the second fixing portion 20 side in the closed state. The point P52 indicates the position corresponding to the other end portion of the axis 7B on the first fixing portion 10 side in the closed state. The point P61 indicates the position corresponding to the end portion of the axis 7B on the second fixing portion 20 side in the intermediate state. The point P62 indicates the position corresponding to the end portion of the axis 7B on the first fixing portion 10 side in the intermediate state. The point P71 indicates the position corresponding to the end portion of the axis 7B on the second fixing portion 20 side in the open state. The point P72 indicates the position corresponding to the end portion of the axis 7B on the first fixing portion 10 side in the open state. Since the vehicle panel 6 is an immovable portion as described above, the points P51, P61, and P71 on the second fixing portion 20 side, which is fixed to the vehicle panel 6, are at the same position.

As indicated by the points P51 and P52, in the second comparative example, the bellows portion is bent into an S-shape in the closed state. Moreover, as indicated by the points P61 and P62, in the second comparative example, the bellows portion is linearly stretched in the intermediate state. Moreover, as indicated by the points P71 and P72, in the second comparative example, the bellows portion is linearly stretched in the open state to be longer than that in the intermediate state. In the second comparative example, the stress exerted on the grommet in accordance with the opening and closing motion of the door panel 5 mainly acts to change the hanging shape of the bellows portion during transition between the closed state and the intermediate state, and mainly acts in a direction in which the stress makes the bellows portion expand and contract during transition between the intermediate state and the open state. In the second comparative example, since the bellows portion expands and contracts during transition between the intermediate state and the open state, bending stress is likely to locally concentrate on the ridge portions and the valley portions of the bellows portion.

Figure 9:
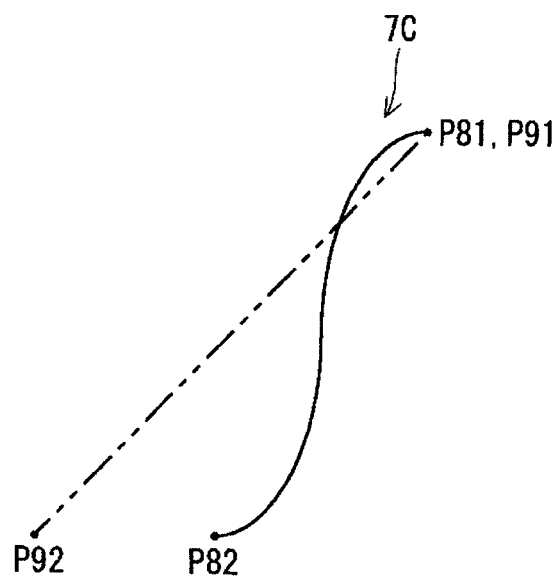
FIG. 9 is a conceptual diagram illustrating paths of an axis of an S-shaped grommet according to a third comparative example.

FIG. 9 is a conceptual diagram illustrating paths of the axis 7C of an S-shaped grommet according to the third comparative example. Note that, in FIG. 9, the axis 7C in the closed state is shown with a solid line, and the axis 7C in the open state is shown with a long dashed double-short dashed line. Moreover, for the purpose of indicating specific positions on the axis 7C in the closed state, points P81 and P82 are shown as imaginary points. For the purpose of indicating specific positions on the axis 7C in the open state, points P91 and P92 are shown as imaginary points.

In FIG. 9, the point P81 indicates the position corresponding to an end portion of the axis 7C on the second fixing portion 20 side in the closed state. The point P82 indicates the position corresponding to the other end portion of the axis 7C on the first fixing portion 10 side in the closed state. The point P91 indicates the position corresponding to the end portion of the axis 7C on the second fixing portion 20 side in the open state. The point P92 indicates the position corresponding to the end portion of the axis 7C on the first fixing portion 10 side in the open state. Since the vehicle panel 6 is an immovable portion as described above, the points P81 and P91 on the second fixing portion 20 side, which is fixed to the vehicle panel 6, are at the same position.

As indicated by the points P81 and P82, in the third comparative example, the bellows portion is bent into an S-shape in the closed state. Moreover, as indicated by the points P91 and P92, in the third comparative example, the bellows portion is linearly stretched in the open state.

Note that, in the third comparative example, the grommet is configured such that the length of the bellows portion in the closed state is the same as the distance between the points P91 and P92 in the open state. For this reason, the stress exerted on the grommet in accordance with the opening and closing motion of the door panel 5 mainly acts to change the hanging shape of the bellows portion, and thus, the durability of the grommet is improved. However, the grommet according to the third comparative example is configured such that there is a large difference in level between the opposite ends of the bellows portion, in order to ensure a sufficient length for the S-shaped bellows portion. Accordingly, compared with the grommet 1 of the present embodiment, device design is difficult in terms of attachment of the grommet-equipped wire to an automobile.

Figure 10:
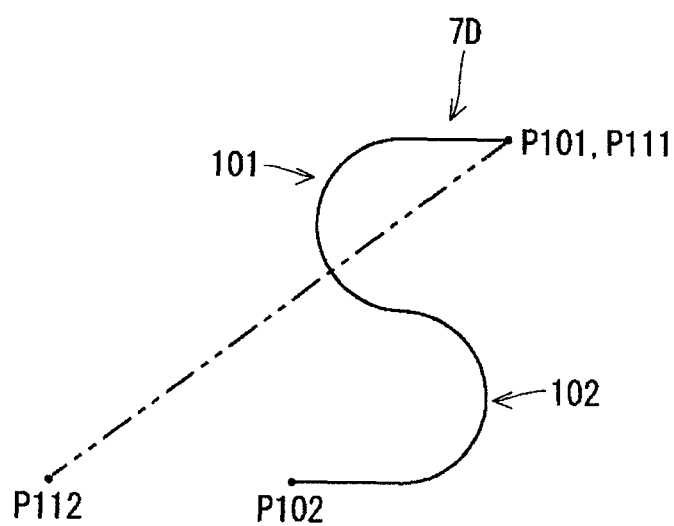
FIG. 10 is a conceptual diagram illustrating paths of an axis of an S-shaped grommet according a fourth comparative example.

FIG. 10 is a conceptual diagram illustrating paths of the axis 7D of an S-shaped grommet according to the fourth comparative example. Note that, in FIG. 10, the axis 7D in the closed state is shown with a solid line, and the axis 7D in the open state is shown with a long dashed double-short dashed line. Moreover, for the purpose of indicating specific positions on the axis 7D in the closed state, points P101 and P102 are shown as imaginary points. For the purpose of indicating specific positions on the axis 7D in the open state, points P111 and P112 are shown as imaginary points.

In FIG. 10, the point P101 indicates the position corresponding to an end portion of the axis 7D on the second fixing portion 20 side in the closed state. The point P102 indicates the position corresponding to the other end portion of the axis 7D on the first fixing portion 10 side in the closed state. The point P111 indicates the position corresponding to the end portion of the axis 7D on the second fixing portion 20 side in the open state. The point P112 indicates the position corresponding to the end portion of the axis 7D on the first fixing portion 10 side in the open state. Since the vehicle panel 6 is an immovable portion as described above, the points P101 and P111 on the second fixing portion 20 side, which is fixed to the vehicle panel 6, are at the same position.

As indicated by the points P101 and P102, in the fourth comparative example, the bellows portion is bent into an S-shape in the closed state. Moreover, as indicated by the points P111 and P112, in the fourth comparative example, the bellows portion is linearly stretched in the open state.

Note that, in the fourth comparative example, the grommet is configured such that the length of the bellows portion in the closed state is the same as the distance between the points P111 and P112 in the open state. Therefore, the stress exerted on the grommet in accordance with the opening and closing motion of the door panel 5 mainly acts to change the hanging shape of the bellows portion, and thus, the durability of the grommet is improved. However, the grommet according to the fourth comparative example is configured such that bent portions 101 and 102 of the bellows portion in the closed state largely protrude leftward and rightward, in order to ensure a sufficient length for the S-shaped bellows portion. Accordingly, in the grommet according to the fourth comparative example, it is difficult to control the behavior of the bellows portion that deforms during opening and closing of the door. Therefore, in the grommet 1 of the present embodiment, in which the state in which the bellows portion 33 hangs down due to the effect of gravity is maintained, compared with the grommet of the fourth comparative example, the bellows portion 33 is less likely to interfere with a nearby member, and the bellows portion 33 can be disposed in a space-saving manner.

Although the present invention has been described in detail above, the foregoing description is to be considered in all respects as illustrative, and the present invention is not limited to the foregoing description. It should be understood that innumerable variations that are not described herein can be envisaged without departing from the scope of the present invention.

LIST OF REFERENCE NUMERALS

1: Grommet
5: Door Panel
6: Vehicle Panel
7, 7A to 7D: Axis
8: Wire
9: Grommet-equipped Wire
10: First Fixing Portion
20: Second Fixing Portion
30: Connecting Portion
31: First Tubular Portion
32: Second Tubular Portion
33: Bellows Portion

What is claimed is:
1. A grommet in which a wire can be inserted, the grommet comprising:
a first fixing structure configured to be fixed to a door panel;
a second fixing structure configured to be fixed to a vehicle panel; and
a connector that is elastically deformable and that connects the first fixing structure and the second fixing structure to each other,
wherein, in a closed condition in which the door panel is closed relative to the vehicle panel, an intermediate portion of the connector hangs down to a level that is lower than levels of opposite end portions of the connector,
an axis line runs through the connector and connects centers of transverse sections of an internal space of the grommet, and in both the closed condition and an open condition in which the door panel is open relative to the vehicle panel, the axis line includes a plurality of inflection points where a concavity of a curvature of the axis line changes directions,
the first fixing structure and the second fixing structure are overlapping in a vertical direction in both the open condition and the closed condition, and
a width between opposing points of the connector in a horizontal direction becomes wider going toward an upper side of the connector in both the open condition and the closed condition.

2. The grommet according to claim 1, wherein, in the open condition in which the door panel is open relative to the vehicle panel, the intermediate portion of the connector hangs down to a level that is lower than the levels of the opposite end portions of the connector, and a hanging-down amount of the intermediate portion in the open condition is smaller than a hanging-down amount of the intermediate portion in the closed condition.

3. The grommet according to claim 1, wherein the connector includes, as constituent elements in which the wire is insertable, a first tubular portion located at one of the end portions of the connector on a side of the first fixing structure, a second tubular portion located at another of the end portions of the connector on a side of the second fixing structure, and a bellows portion that has a bellows shape and that is connected to the first tubular portion and the second tubular portion, and a portion of the first tubular portion on a first side of the bellows portion and a portion of the second tubular portion on a second side of the bellows portion both extend downward.

4. The grommet according to claim 1, wherein the intermediate portion deforms in accordance with switching between the open condition in which the door panel is open relative to the vehicle panel and the closed condition, the opposite end portions of the connector have a same shape in both the open condition and the closed condition, and a length of the intermediate portion is larger than a distance between the opposite end portions in the open condition.

5. A grommet-equipped wire comprising:

the grommet according to claim 1; and the wire that is inserted in the grommet.

6. The grommet according to claim 1, wherein a middle point of the connector hangs down to the level that is lower than the levels of the opposite end portions of the connector in the closed condition.

7. The grommet according to claim 1, wherein a middle point of the connector hangs down to the level that is lower than the levels of the opposite end portions of the connector in the open condition.

8. The grommet according to claim 1, wherein an entire portion of the connector that is disposed between two of the plurality of inflection points is entirely formed of bellows.

* * * * *